United States Patent

[11] 3,582,943

[72] Inventor David R. Weller
Bernardsville, N.J.

[21] Appl. No. 782,103
[22] Filed Dec. 9, 1968
[45] Patented June 1, 1971

[73] Assignee Bell Telephone Laboratories, Incorporated
Murray Hill and Berkeley Heights, N.J.

[54] HIGH-SPEED DIGITAL-TO-ANALOG CONVERTER
7 Claims, 7 Drawing Figs.

[52] U.S. Cl. .......... 340/347, 307/242
[51] Int. Cl. .......... H03r 13/02
[50] Field of Search .......... 340/347
D/A; 328/71; 307/242, 203, 294, 296

[56] References Cited

UNITED STATES PATENTS

| | | | |
|---|---|---|---|
| 2,970,308 | 1/1961 | Stringfellow et al. .......... | 307/242 |
| 3,019,426 | 1/1962 | Gilbert .......... | 307/242 |
| 3,243,665 | 3/1966 | Fayer et al. .......... | 307/242 |
| 3,248,563 | 4/1966 | Lin .......... | 307/296 |

*Primary Examiner*—Thomas A. Robinson
*Attorneys*—R. J. Guenther and William L. Keefauver

ABSTRACT: A high-speed digital-to-analog converter of the current-summing type is disclosed wherein a digital control register drives a plurality of current sources, all of the current sources being simultaneously switched on or off when digital inputs are applied. The time at which the simultaneous switching occurs is determined by the bias level of the current switches which is, in turn, determined by the characteristics of the digital control register.

INVENTOR
D. R. WELLER
BY R. O. Nimtz
ATTORNEY

HIGH-SPEED DIGITAL-TO-ANALOG CONVERTER

FIELD OF THE INVENTION

This invention relates to electrical signal conversion and specifically to the conversion of digital signals into analog signals.

BACKGROUND OF THE INVENTION

There are several common types of digital-to-analog converters known to the prior art. A particular example is the current-summing type which has one stage for each bit of the binary coded decimal number to be converted. Each stage comprises a weighted constant-current generator that provides a precise value of current to a common output resistor when a bit is present at its input. Precision resistors in each stage weight the current generated by the particular stage so that each bit contributes to the output voltage in proportion to its value. Typically, the precision resistors are chosen so that the value of the current generated by the presence of a particular bit is one-half the value of the current generated by the presence of the next most significant bit. An example of such a prior-art digital-to-analog converter is U.S. Pat. No. 3,223,994, granted to J. D. Cates on Dec. 14, 1965.

Digital-to-analog converters have a wide range of application. They are commonly used to enable digital signals to be transformed into signals that can be used for apparatus control. This discrete process is normally performed at a rate sufficiently rapid to achieve essentially continuous control of the apparatus. Rapid switching of the various stages of a digital-to-analog converter results in the well-known phenomenon of transition noise; that is, transient voltage spikes in the output signal. The appearance of these switching transients in the output, commonly termed feed through, is undesirable since they delay the settling time of any circuit to which the analog signal is applied and thus limit the rate at which command signals can be generated.

The switching noise in the output signal from a digital-to-analog converter is greatest when a major transition occurs at the input, that is, when the most significant bit changes in one direction and the rest of the bits change in the other direction. The value of the settling time after a major transition thus normally determines the speed at which the digital-to-analog converter may be used to drive the controlled apparatus.

It is the object of this invention to provide a high-speed digital-to-analog converter which minimizes the feed through of switching signals, especially those generated by a major transition of the input.

SUMMARY OF THE INVENTION

In accordance with the present invention this object is achieved in the combination of a digital control register and a plurality of parallel-connected current switches, each of which feeds a proportional current into a resistive network. The invention achieves high-speed conversion and minimizes the generation of switching transients by using current switches having a common threshold. The threshold is determined by the digital control register waveform characteristics so as to achieve simultaneous switching of all appropriate stages upon the application to the register of a binary coded decimal number which is to be converted.

DETAILED DESCRIPTION

Figure 1:
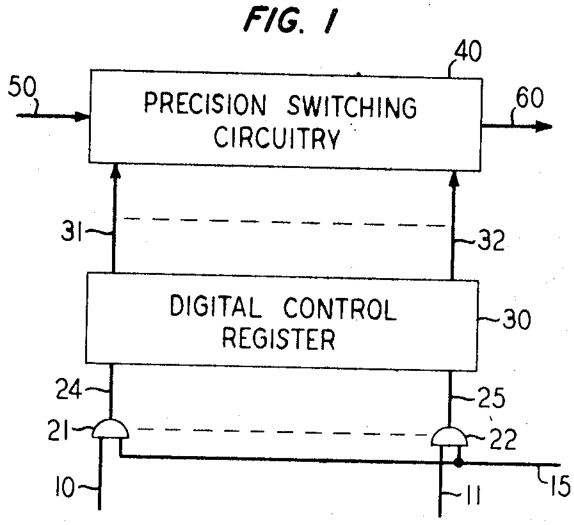
FIG. 1 is a block diagram of the present invention.

FIG. 1 is a block diagram of a digital-to-analog converter of the type in which the present invention is useful. The $n$ bit digital signal to be converted is placed on lines 10, 11 and enters the digital-to-analog converter through AND gates 21, 22 when a clock signal is present on line 15. The repetition rate of the clock signal is determined by the requirements of the particular system in which the digital-to-analog converter is used. The clock signal is required regardless of the speed at which the digital-to-analog converter is operated, for reasons that will be apparent from the explanation of FIG. 2C.

The digital control register 30 can be one of the many commercially available types of digital registers as, for example, the type known as the "SN7495N," manufactured by the Texas Instrument Corporation, or it may simply comprise $n$ identical flip-flops, one for each bit to be converted.

The presence of signals on lines 24, 25 causes the appropriate bit positions in digital control register 30 to change state. This change is transferred to precision switching circuitry 40 on lines 31, 32. After a time delay determined by the value of the switching threshold voltage on line 50, as hereinafter described, the precision switching circuitry 40 converts the digital value stored in digital control register 30 into an analog signal appearing on output line 60.

Figure 2A:
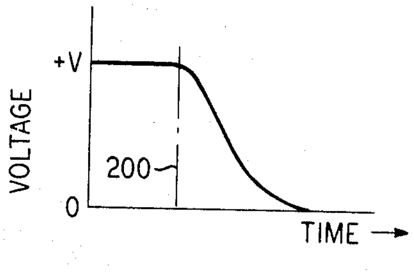
FIGS. 2A, 2B, 2C show the output waveform characteristics of the digital control register.
Figure 2B:
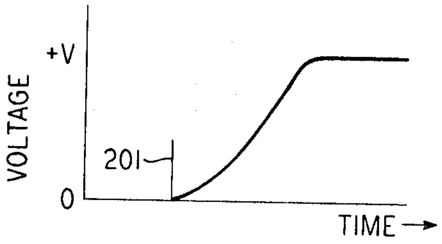
Figure 2C:
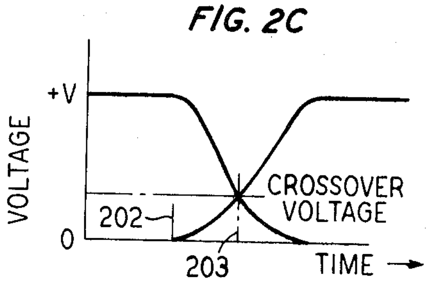

FIGS. 2A, 2B, 2C show typical output waveform characteristics of digital control register 30. FIG. 2A shows the output of a stage of digital control register 30 changing from a "1" level to a "0" level in response to an input caused by a clock signal that occurs at time 200. FIG. 2B shows the output of a stage of digital control register 30 changing from a "0" level to a "1" level in response to an input change caused by a clock signal that occurs at time 201. FIG. 2C is a superposition of FIGS. 2A and 2B with the clock signal occurring at time 202. At the crossover point 203 the output of each stage simultaneously passes through the same voltage level.

Figure 3:
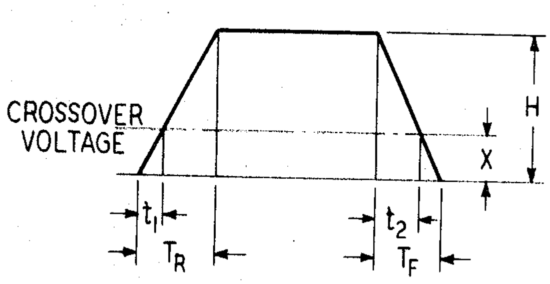
FIG. 3 illustrates the manner in which the precision switching threshold may be analytically determined from the output waveform characteristics of the digital control register.

The value of this crossover voltage for a particular register can be obtained experimentally using a dual-trace oscilloscope and an oscilloscope camera to produce a picture similar to FIG. 2C. Alternatively, the value may be analytically derived as shown in FIG. 3. Assuming a trapezoidal waveshape of magnitude H and defining $T_R$ as the time required for a stage to go from the "0" level to the "1" level, $T_F$ as the time required for a stage to go from the "1" level to the "0" level, $t_1$ as the time to rise from the "0" level to the crossover voltage, and $t_2$ as the time to fall from the "1" level to the crossover voltage, the following relationships for $t_1$ and $t_2$ can be found by similar triangles:

$$\frac{t_1}{T_R}=\frac{X}{H} \quad (1)$$

$$\frac{t_2}{T_F}=\frac{H-X}{H} \quad (2)$$

At the crossover level, $t_1=t_2$. Solving equation (1) for $t_1$ and equation (2) for $t_2$ and equating them gives $$X=\frac{T_F}{T_R+T_F}H \quad (3)$$

as the value of the crossover voltage.

Using the value of this crossover voltage as a switching threshold voltage for the current-generating stages of the precision switching circuitry 40 insures simultaneous switching of all stages. This directly minimizes the feed through of switching signals thus achieving the object of the invention.

Figure 4:
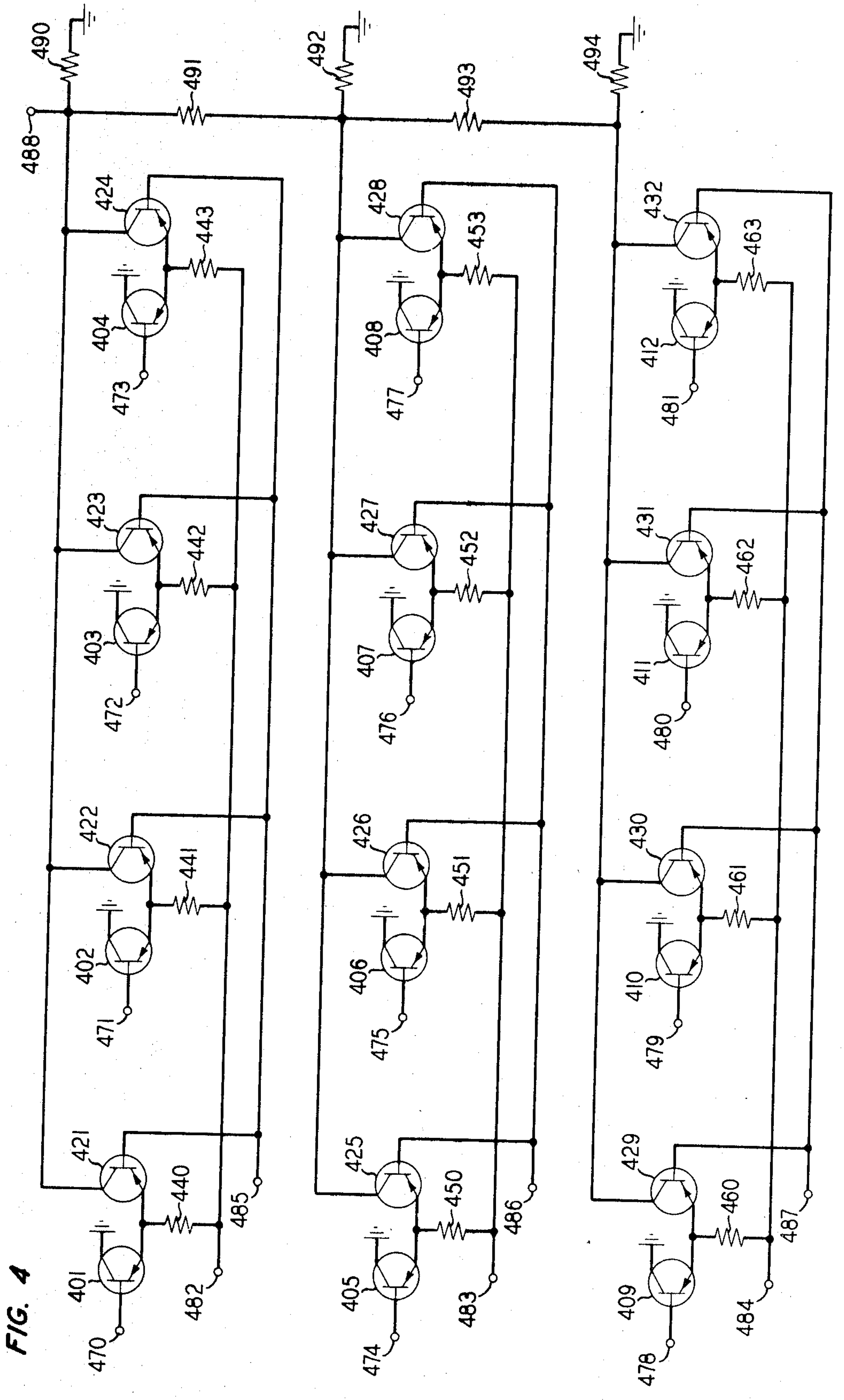
FIG. 4 is a circuit diagram of the precision switching circuitry.

FIG. 4 is a circuit diagram of the precision switching circuitry 40 shown in FIG. 1. The circuit shown provides for the conversion of a digital word comprising 12 bits. The digital word to be converted is applied to terminals 470...481 with the most significant bit being applied to terminal 470 and the least significant bit being applied to terminal 481. A reference voltage is applied to terminals 482...484. The value of this voltage along with the value of the weighting resistors 440...463 determines the magnitude of the currents generated. The switching threshold voltage, determined in the manner hereinbefore described, is applied to terminals 485...487 and thus to the bases of transistors 421...432. The output of the circuit appears at terminal 488.

Figure 5:
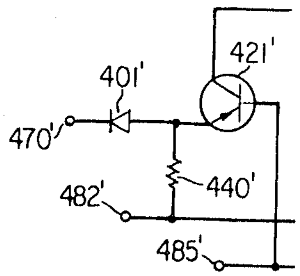
FIG. 5 shows an alternative embodiment which may be used in each stage of the circuit of FIG. 4.

Transistor 401 shown in FIG. 4 is switched on and off by a signal appearing on terminal 470. When there is no signal on terminal 470, transistor 401 is conducting and the emitter of transistor 421 is essentially at zero voltage. A positive voltage level appearing at terminal 470 will decrease the conduction of transistor 401 and cause the emitter of transistor 421 to rise above ground. When the emitter of transistor 421 rises above the value of the switching threshold voltage which is applied to its base through terminal 485, it will begin to conduct. When the voltage at terminal 470 drops sufficiently to cause the emitter of transistor 421 to drop below the value of the switching threshold voltage, transistor 421 will cease to conduct. Each stage operates in the same manner, transistors 401...412, being the input transistors, and transistors 421...432, being the switching transistors of each respective stage. Alternatively, input transistors 401...412 could be replaced by diodes 401', as shown in FIG. 5. FIG. 5 represents the first stage of the circuit of FIG. 4, as is signified by the primed reference numerals in FIG. 5.

In FIG. 4, the circuit is divided into three sections each comprising four stages. Section 1 comprises the stages having input terminals 470...473; section 2 comprises the stages having input terminals 474...477; and section 3 comprises the stages having input terminals 478...481. This division maintains a high gain-bandwidth product and thus maximizes the speed at which the digital-to-analog converter can be driven. In a current-summing type of digital-to-analog converter, the current weighting is usually determined by precision resistors in each stage whose values are normally in ascending powers of two, beginning with the most significant bit. Resistors 440...443, 450...453 and 460...463 serve to provide the current weighting. If the circuit were not divided as shown and resistor 440 in the most significant stage was, for example, 2 K ohms, resistor 463 in the least significant stage would have to be 4.906 M ohms. Assuming for purposes of illustration that the reference voltage applied to terminals 482...484 is 30 volts, the current in the high-order stage would be less than 8 microamperes. As is well known, such a small value of current would cause the gain-bandwidth product of transistor 432 to be objectionably low and would hence greatly decrease the bandwidth of the entire circuit.

The circuit of FIG. 4 minimizes the reduction of the gain-bandwidth product by dividing the circuit into three identical sections. Thus resistors 440 ... 443 have the same values as resistors 450 ... 453 and 460 ... 463 respectively. For example, resistors 440, 441, 442 and 443 may have the respective values 2K, 4K, 8K and 16K ohms. Thus there is only an 8 to 1 ratio of collector currents instead of the 2,048 to 1 ratio of collector currents that would result if the circuit were not divided into three stages.

In order to maintain the proper current weighting between the sections, the values of resistors 490 ... 494 must be chosen so as to weight all currents from section 2 by one-sixteenth as much as those from section 1, and all currents from section 3 by one two hundred fifty-sixth as much as those from section 1. This constraint only determines the relationship between the values of resistors 490...494. The particular set of correctly related values that is used in any particular application will be determined by the desired output resistance of the digital-to-analog converter. It can be seen in FIG. 4 that the network of resistors 490...494 is symmetrical. This indicates that resistor 490 will have the same value as resistor 494 and that resistor 491 will have the same value as resistor 493. An obvious application of Ohm's law further indicates that in order to achieve the desired current weighting between the sections, the value of resistor 491 must be 15 times as great as resistor 490, and the value of resistor 492 must be sixteen-fifteenths times as great as resistor 490. When a desired output resistance is chosen and assigned as the value of resistor 490, the values of the resistors 491...494 are uniquely determined.

This description has set forth the novel features of the invention as illustrated by a preferred embodiment. It is to be understood that omissions, additions, or substitutions in the form and details of the novel circuit shown herein as, for example, to increase or decrease the number of bits that can be converted, can be made by those of ordinary skill in the art without departing from the spirit and scope of this invention.

What I claim is:

1. A digital-to-analog converter comprising:

means for current summing including a plurality of parallel-connected current switches each having an ON state and an OFF state;

means for receiving the simultaneous application of individual switching signals at each of said plurality of current switches whereby particular ones of said current switches are caused to change state; and means dependent upon the waveform characteristics of said individual switching signals for controlling said current switches, whereby said state changes are caused to begin simultaneously at a predetermined time after said switching signals are applied.

2. A digital-to-analog converter comprising means for current summing including a plurality of parallel-connected current switches; means for simultaneously applying either a first input voltage level or a second input voltage level to each of said plurality of current switches; and means for selectively controlling said current switches whereby all switching occurs at a predetermined time $t$ after said simultaneous input voltages are applied where $$t=\frac{T_R T_F}{T_R+T_F}$$

and where $T_R$ is the time required for said first input voltage level to change to said second input voltage level, and $T_F$ is the time required for said second input voltage to change to said first input voltage level.

3. A digital-to-analog converter according to claim 2 wherein said means for selectively controlling said current switches comprises a threshold voltage $v$ where $$v=\frac{T_F}{T_R+T_F}\cdot H$$

and where $H$ is the value of the difference between said second input voltage level and said first input voltage level.

4. A digital-to-analog converter comprising:

means for current summing including a plurality of parallel-connected current switches each having an ON state and an OFF state;

means for the simultaneous application of individual switching signals to each of said plurality of current switches whereby particular ones of said current switches are caused to change state; and means dependent upon the waveform characteristics of said individual switching signals for controlling said current switches, whereby said state changes are caused to begin simultaneously at a predetermined time after said switching signals are applied.

5. A digital-to-analog converter comprising:

means for current summing including a plurality of parallel-connected current switches;

means for receiving the simultaneous application of either a first input voltage level or a second input voltage level at each of said plurality of current switches whereby particular ones of said current switches are caused to change state; and means for causing all of said state changes to occur at a predetermined time $t$ after said simultaneous application of said switching signals where $$t=\frac{T_R T_F}{T_R+T_F}$$

and where $T_R$ is the time required for said first input voltage level to change to said second input voltage level, and $T_F$ is the time required for said second input voltage to change to said first input voltage level.

6. A digital-to-analog converter according to claim 5 wherein said means for causing all of said state changes to occur at a predetermined time $t$ comprises a threshold voltage $v$ where $$v=\frac{T_F}{T_R+T_F}\cdot H$$

and where $H$ is the value of the difference between said second input voltage level and said first input voltage level.

7. A digital-to-analog converter including at least one stage comprising:

a transistor;

a resistor connected to the emitter of said transistor;

a diode connected to the emitter of said transistor whereby a switching signal to be converted may be applied;

means for biasing the base of said transistor to a voltage $v$, where the value of $v$ is dependent upon the waveform characteristics of said switching signal; and a resistive network connected to the collector of said transistor, whereby the output signal appearing on the collector of said transistor can be appropriately weighted.